United States Patent [19]

Eichinger et al.

[11] 4,027,553

[45] June 7, 1977

[54] ANGLE GEAR DRIVE ARRANGEMENT

[75] Inventors: Johann Eichinger, Putzbrunn; Wilhelm Schwibach, Munich, both of Germany

[73] Assignee: Carl Hurth Maschinen- und Zahnradfabrik, Munich, Germany

[22] Filed: June 4, 1976

[21] Appl. No.: 692,865

[30] Foreign Application Priority Data

July 25, 1975 Germany .......................... 2533305
July 25, 1975 Germany .......................... 2533306

[52] U.S. Cl. ................................... 74/801; 74/417
[51] Int. Cl.² ...................... F16H 1/28; F16H 1/14; F16H 1/20
[58] Field of Search ............................. 74/417, 801

[56] References Cited

UNITED STATES PATENTS 2,452,660  11/1948  Hussey ............................. 74/417 X
2,732,731  1/1956  Schmitter et al. ................. 74/417 X Primary Examiner—Leonard H. Gerin
Attorney, Agent, or Firm—Woodhams, Blanchard and Flynn

[57] ABSTRACT

An angle gear drive arrangement for a steerable propeller on a watercraft or other type of vehicle in which a driven shaft is supported in a gear housing and is driven by a pair of bevel gears. The driven bevel gear of the pair of bevel gears is mounted on a hollow shaft which is supported independently from a driven shaft. The hollow shaft encircles and is coupled to the driven shaft. The hollow shaft is supported at one end by a combined radial-axial bearing arrangement wherein one of the bearing members absorbs both radial and axial forces while the other bearing absorbs only axial forces.

4 Claims, 2 Drawing Figures

ANGLE GEAR DRIVE ARRANGEMENT

FIELD OF THE INVENTION

The invention relates to an angle gear drive arrangement, in particular for high performances, for example for a steerable propeller or the like for watercraft, in which a driven shaft is supported in a gear housing and can be driven through a pair of bevel gears.

BACKGROUND OF THE INVENTION

The basic purpose of the invention is to provide a reliable support for a hollow shaft and a simple installation having a compact method of construction for the gear drive arrangement.

This purpose is attained with a gear in which the driven bevel gear of the pair of bevel gears is arranged on a hollow shaft supported independently from a driven shaft and encircling same and is coupled to the driven shaft, and in which the hollow shaft is supported at one end by two head-on arranged combined radial-axial-bearings, for example two tapered-roller bearings, of which one is installed in such a manner that it absorbs both radial and also axial forces, while the other bearing is mounted with radial play so that it absorbs only axial forces.

With a support according to the invention, the high axial forces of the bevel gear are absorbed by a pair of bevel gears so that an overloading due to inexact centerings and subsequent jammings is avoided.

In order for the free outer race of the one tapered-roller bearing not being able to rotate, the invention is further developed such that the outer race of the bearing has radial play and is secured against rotation.

To attain the above purpose, the invention can be constructed such that the driven shaft is transversely cut near the support remote from the output end, for example the propeller, and both shaft parts are centered in one another and are secured together.

From the standpoint of sturdiness, a development of the invention is preferable which has both a radial support and an axial support on the end of the driven shaft remote from the output end, for example the propeller, whereby the joint between the two shaft parts is arranged between the radial support and the axial support.

Further advantages and characteristics can be taken from the following description.

BRIEF DESCRIPTION OF THE DRAWINGS

The invention is discussed in connection with one exemplary embodiment including two drawings, in which.

DETAILED DESCRIPTION

Figure 2:
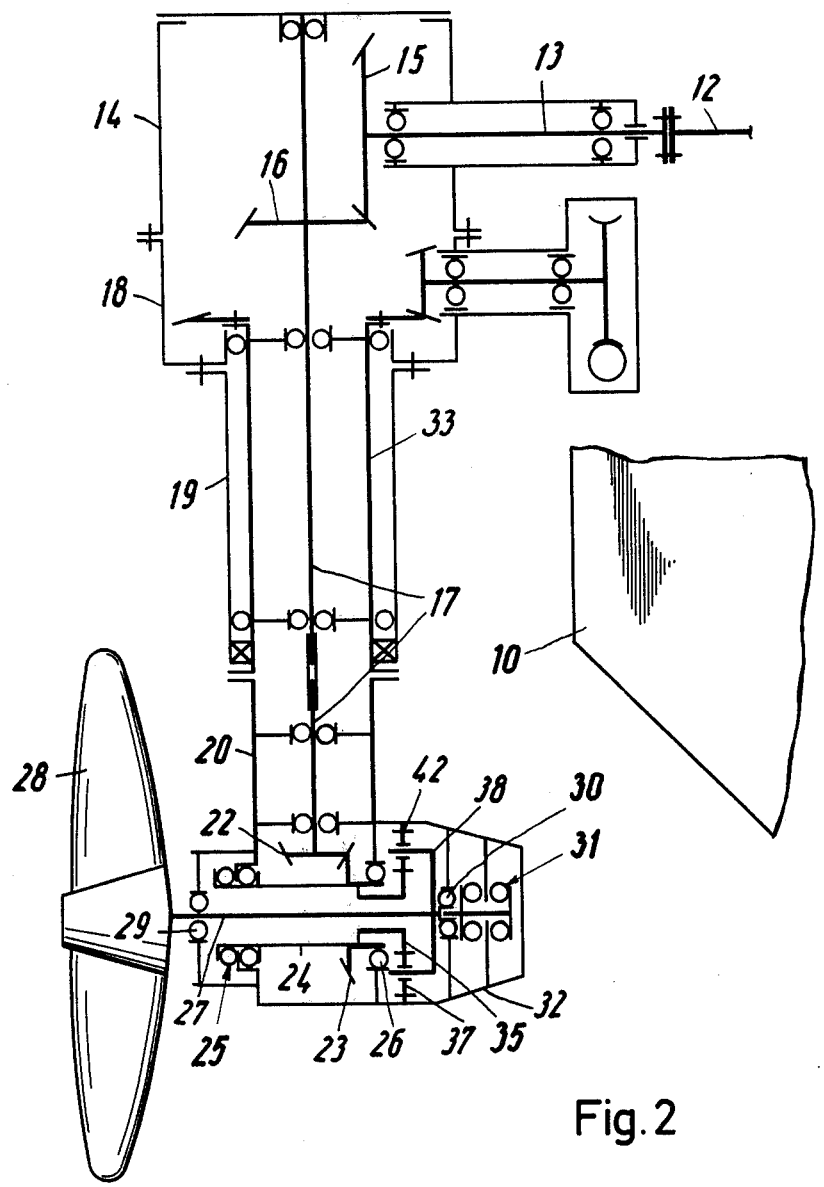
FIG. 2 illustrates the entire arrangement of a steerable propeller, on which the invention can be applied.

A steerable propeller is mounted on a suited place on the outboard side, for example at the stern, of a watercraft 10 or the like (FIG. 2) for the purpose of driving and controlling the watercraft. The fastening means are known and are, therefore, not illustrated. An input drive shaft 13, which is supported in an above-water housing 14 of the steerable propeller, is driven by a not illustrated drive motor in the vehicle through common drive transmitting devices, for example, a transmission shaft 12 from the drive motor. A bevel gear 15 is fixedly connected to the free end of the drive shaft 13 and for rotation therewith. The bevel gear 15 mates with a bevel pinion gear 16 which is fixedly connected to a transmission shaft 17 and for a driving rotation thereof. The transmission shaft 17 is vertically aligned and extends from the above-water housing 14 through a control housing 18 and a shaft housing 19 and terminates in an under-water housing 20. The steerable propeller is pivoted for the purpose of control about the axis of the transmission shaft 17. A bevel pinion gear 22 is fixedly secured to the lower end of the vertical drive shaft 17. The bevel pinion gear 22 mates with a bevel gear 23 mounted on a shaft 24 and causes the torque flow path to be changed from the vertical transmission shaft 17 to the horizontal shaft 27. The two last-mentioned bevel gears 22, 23 are also shown schematically in FIG. 2. The shaft 24 is hollow and is rotatably supported by bearings 25, 26 in a gear housing 32. The gear housing 32 is a part of the under-water housing 20. The hollow shaft 24 encircles a drive shaft 27 and has a propeller 28 mounted thereon and rotatable therewith. A clearance space is provided between the shafts 24 and 27.

The driven shaft 27 is rotatably supported by radial bearings 29, 30 and is further supported at the end remote from the propeller by an axial thrust bearing 31 for absorbing the axial thrust of the propeller. The bevel gear 23 is provided with clutch teeth 23A at the end remote from the bevel gear teeth which are engaged with a corresponding set of teeth on a sun pinion gear 35 of a planetary gearing. The teeth of the sun pinion gear 35 mates with a set of planetary gears 37 which are supported in a conventional manner in a planetary carrier 38. The planetary carrier 38 is secured via suitable means, for example, by a splined connection to the drive shaft 27 against rotation and against radial shifting. The planetary gears 37 mate with a internally toothed ring gear 42. The internally toothed ring gear 42 is secured in the gear housing 32. The sun pinion gear 35 is unsupported and is guided by the planetary gears 37. The under-water housing 20 is secured at one end via screws to a control sleeve 33 which is secured at the other end to the bottom of the above-water housing. The control sleeve 33 and thus the under-water housing is pivotal about the axis of the transmission shaft 17 and can be driven by a not shown control stand through conventional means, in order to control the direction of movement of the watercraft.

Figure 1:
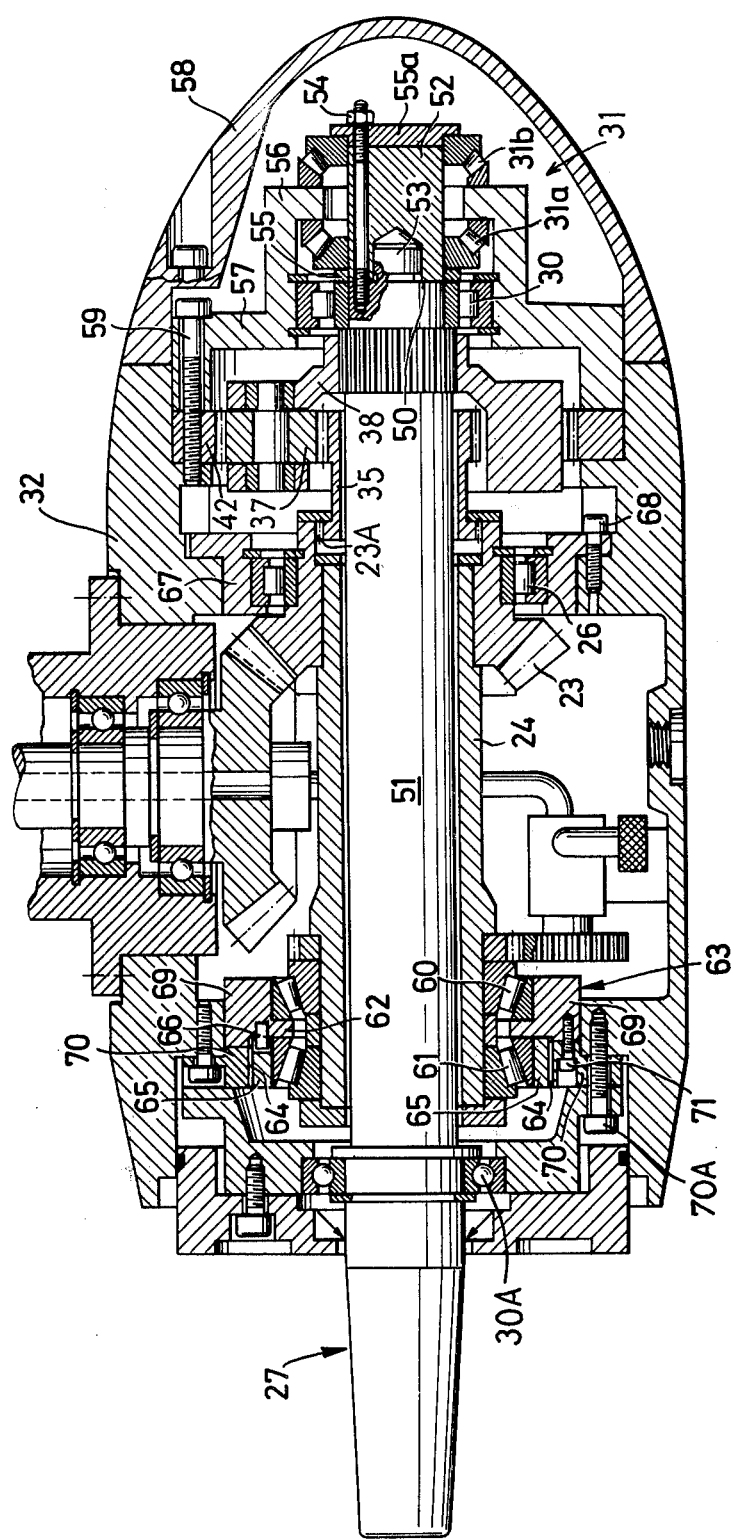
FIG. 1 illustrates an example for a miter gear according to the invention.

As is shown more in detail in FIG. 1, the driven shaft 27 is transversely divided near the radial bearing 30 on a side remote from the propeller so that a joint 50, viewed from the propeller, is provided on the other side of the radial bearing 30, so that the joint receives no bending moment. The driven shaft 27 consists thus of a main shaft 51 which supports the propeller 28 and is supported by the radial bearings 30 and 30A and a pin 52 connected thereto. Both of the parts 51 and 52 are joined together by a centering means 53 and with screws 54. Two tapered-roller bearings 31a, 31b are centered on the pin 52 to form the above-mentioned axial thrust bearing 31. The tapered-roller bearings are axially clamped together by disks 55, 55a in such a manner that the bearings engage both sides of a flange 56 on a bearing lid 57; the bearing lid being centered in the gear housing 32 and is secured with screws 59 thereto. The tapered-roller bearings 31a and 31b are centered on the pin 52, however, are otherwise radially not held, so that they absorb only axial forces. The front end of the gear housing 32 is closed off by a lid 58. The main shaft 27 can thus according to FIG. 2 be installed in the gear housing 32 from the left, while the bearings 30, 31 which form one unit with the pin 52 and the bearing lid 57 can be assembled outside the gear housing 32 and then connected to the gear housing as a unit.

As is also shown more in detail in FIG. 1, the hollow shaft 24 is supported on the end remote from the propeller 28 by a radial bearing 26 in the gear housing 32; namely, for this purpose the bearing 26 which supports the bevel gear 23 is mounted in a sleeve 67 which is centered in the gear housing and is secured thereto by screws 68. The diameter of the centering part of the sleeve 67 is larger than the largest diameter of the bevel gear 23.

A combined radial-axial-bearing is provided on the propeller side end of the hollow shaft 24 and consists of two tapered-roller bearings 60, 61 which are tapered in opposite directions and which are mounted on axially opposite sides of a collar 62 of an end shield 63. The end shield 63 is transversely divided and consists of a centering part 69 and a flange part 70. Both of the parts 69 and 70 are connected by screws 71. The centering part 69 is used to center a tapered-roller bearing 60 therein in the gear housing 32, the flange part 70 is used to fasten the centering part to the gear housing. In order that the flange of the sleeve 67 and the flange part 70, which both engage the gear housing, are adjusted to one another, the transverse joint between the centering part 69 and the flange part 70 is fitted by grinding off or by the interpositioning of disks during installation. The sleeve 67 and the transversely divided end shield 63 permit an assembly of the hollow shaft 24 with the associated parts as one unit according to FIG. 1 from the right. It is then only necessary to connect from the left with one another the flange part 70 with the centering part 69 and the flange part 70 with the gear housing 32 by screws 70A. The inner races of the tapered-roller bearing 60, 61 are centered and held together on the hollow shaft 24. While the one tapered-roller bearing 60 of the pair of tapered-roller bearings is centered in the centering part 69, the outer race of the other bearing has clearance 64 toward the flange part 70 so that jammings do not occur due to a double centering and the bearings are thus not overloaded. The outer race of the tapered-roller bearing 61 which is not centered on the outside is fixedly surrounded by a ring 65, which is secured against rotation by a pin 66 to the centering part 69. Thus the outer race of this bearing is also secured against rotation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an angle gear drive arrangement, in particular for high performances, for example for a steerable propeller or the like for watercraft, in which a driven shaft is supported in a gear housing and can be driven through a bevel-gear pair, the improvement comprising the driven bevel gear of the bevel gear-pair is arranged on a hollow shaft, which is supported independently from the driven shaft and encircling same and is coupled with the driven shaft, and wherein the hollow shaft is supported at one end with two head-on arranged combined radial-axial-bearings, for example two tapered-roller bearings, of which the one is installed in such a manner that it absorbs both radial and also axial forces, while the other bearing is mounted with radial play, so that is absorbs only axial forces.

2. The improved gear arrangement according to claim 1, wherein the outer race of the bearing which has the radial play is secured against rotation.

3. The improved gear arrangement according to claim 1, wherein the driven shaft is transversely divided near the support remote from the output end and both shaft parts are centered into one another and are secured together.

4. The improved gear arrangement according to claim 3, including a steerable propeller with a radial support and an axial support on the side of the driven shaft remote from the output end; and wherein the joint between the two shaft parts is arranged between the radial bearing and the axial bearing.

* * * * *